(12) United States Patent
Petersen et al.

(10) Patent No.: US 12,037,979 B2
(45) Date of Patent: Jul. 16, 2024

(54) METHOD FOR HANDLING A WIND TURBINE COMPONENT AND ASSOCIATED LIFTING SYSTEM

(71) Applicant: Vestas Wind Systems A/S, Aarhus N. (DK)

(72) Inventors: Henrik Petersen, Horens (DK); Jakob Anders Sørensen, Fredericia (DK)

(73) Assignee: Vestas Wind Systems A/S, Aarhus N. (DK)

( * ) Notice: Subject to any disclaimer, the term of this patent is extended or adjusted under 35 U.S.C. 154(b) by 257 days.

(21) Appl. No.: 17/617,363

(22) PCT Filed: Jun. 9, 2020

(86) PCT No.: PCT/DK2020/050164
§ 371 (c)(1),
(2) Date: Dec. 8, 2021

(87) PCT Pub. No.: WO2020/249174
PCT Pub. Date: Dec. 17, 2020

(65) Prior Publication Data
US 2022/0220942 A1    Jul. 14, 2022

(30) Foreign Application Priority Data

Jun. 11, 2019  (DK) .......................... PA 2019 70363

(51) Int. Cl.
*F03D 13/10* (2016.01)
*B66C 1/10* (2006.01)
(Continued)

(52) U.S. Cl.
CPC .............. *F03D 13/10* (2016.05); *B66C 1/108* (2013.01); *B66C 23/185* (2013.01);
(Continued)

(58) Field of Classification Search
CPC ...... F03D 13/10; F03D 1/0658; F03D 1/0675; B66C 1/108; B66C 23/185; B66C 23/207; F05B 2230/61
See application file for complete search history.

(56) References Cited

U.S. PATENT DOCUMENTS 1,625,552 A      4/1927  Lewis
8,317,244 B1 *  11/2012  Schuyleman ........... B66C 1/105
                                                    294/67.5
(Continued)

FOREIGN PATENT DOCUMENTS

CA    3024915 A1   12/2017
EP    3130796 A1    2/2017
(Continued)

OTHER PUBLICATIONS

China National Intellectual Proprty Administration, office action issued in correpsonding Chinese Application No. 202080049984.6, dated Apr. 27, 2023.
(Continued)

*Primary Examiner* — Mark R Wendell
(74) *Attorney, Agent, or Firm* — Wood Herron & Evans LLP

(57) ABSTRACT

A method for handling a wind turbine component (20) is disclosed. The method includes providing a lifting system including a hoist cable (36) and an attachment assembly (38). The attachment assembly includes one or more removable ballast weights (48). The method includes positioning the attachment assembly near a working surface, removing at least some of the one or more ballast weights from the attachment assembly, and attaching a lifting tool (34) to the attachment assembly. The combined weight of the attachment assembly and the lifting tool is sufficiently greater than a threshold weight of the lifting system. The method further includes attaching a wind turbine component to the lifting (Continued)

tool and moving the wind turbine component using the lifting system. A lifting system is also disclosed. The lifting system includes a hoist cable, an attachment assembly, and a lifting tool. The combined weight of the attachment assembly and the lifting tool is sufficiently greater than a threshold weight of the lifting system.

18 Claims, 6 Drawing Sheets

(51) Int. Cl.
  *B66C 23/18* (2006.01)
  *B66C 23/20* (2006.01)
  *F03D 1/06* (2006.01)

(52) U.S. Cl.
  CPC .......... *B66C 23/207* (2013.01); *F03D 1/0658* (2013.01); *F03D 1/0675* (2013.01); *F05B 2230/61* (2013.01)

(56) References Cited

U.S. PATENT DOCUMENTS

| | | | | |
|---|---|---|---|---|
| 2007/0266538 | A1* | 11/2007 | Bervang | F03D 1/0658 29/700 |
| 2008/0216301 | A1* | 9/2008 | Hansen | B66C 23/185 29/889 |
| 2008/0307647 | A1* | 12/2008 | Kessler | F03D 1/0658 29/889 |
| 2009/0025219 | A1* | 1/2009 | Hansen | B66C 23/36 29/283 |
| 2011/0094987 | A1* | 4/2011 | Botwright | B66C 23/62 212/270 |
| 2011/0123274 | A1* | 5/2011 | Soe-Jensen | B66C 23/52 405/195.1 |
| 2011/0221215 | A1* | 9/2011 | Botwright | B66C 13/08 294/81.4 |
| 2011/0285157 | A1 | 11/2011 | Bohler | |
| 2013/0125397 | A1* | 5/2013 | Van den Berg | B66C 13/08 405/196 |
| 2015/0219067 | A1 | 8/2015 | Clymans | |
| 2015/0368075 | A1* | 12/2015 | Clymans | B66C 23/52 212/273 |
| 2016/0010621 | A1 | 1/2016 | Zuteck | |
| 2021/0355917 | A1* | 11/2021 | Olsen | F03D 13/25 |

FOREIGN PATENT DOCUMENTS

| | | |
|---|---|---|
| GB | 2569949 A | 7/2019 |
| JP | H10139363 A | 5/1998 |
| WO | 2017220459 A1 | 12/2017 |
| WO | 2018192675 A1 | 10/2018 |

OTHER PUBLICATIONS

Danish Patent and Trademark Office, Search and Examination Report in PA 2019 70363, Nov. 1, 2019.

European Patent Office, International Search Report and Written Opinion in PCT/DK2020/050164, Sep. 14, 2020.

RopeBlock: "Lifting & Rigging Fast Reeve crane Blocks Standard Reeve Crane Blocks Overhaul Balls Snatch Blocks Sheaves Hooks Swivels Sockets", Feb. 1, 2017 ( Feb. 1, 2017), pp. 1-92, XP005726685, Retrieved from the Internet: URL:https://ropeblock.com/static/default/files/documents/downloads/Ropeblock%20Lifting%20&%20Rigging_Imperial.pdf [retrieved on Sep. 1, 2020] p. 46-p. 47.

Johnson: "Johnson Product Catalog", Jan. 1, 2009 (Jan. 1, 2009), pp. 1-8, XP055726697, Retrieved from the Internet: URL: http://www.gunnebojohnson.com/wp-content/uploads/JProdCtlg_1-09.pdf [retrieved on Sep. 1, 2020] p. 3.

* cited by examiner

METHOD FOR HANDLING A WIND TURBINE COMPONENT AND ASSOCIATED LIFTING SYSTEM

TECHNICAL FIELD

The invention relates generally to methods for handling payloads with a lifting system, and more particularly to methods for handling a wind turbine component during assembly or disassembly of a wind turbine.

BACKGROUND

Wind turbines are used to produce electrical energy using a renewable resource and without combusting a fossil fuel. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator.

When erecting or dismantling wind turbines, it is normally necessary to use an external lifting system, such as a crane, for handling the tower sections, nacelles, hubs, wind turbine blades, etc. As the size of wind turbines increases and the components become heavier, lifting systems with greater lifting capacity are required to lift the heavy components. Lifting systems with greater lifting capacity, however, are more expensive to rent and operate and are more difficult to move to the installation site. In some cases, the cost of renting such a lifting system may even exceed the cost of manufacturing elements of a wind turbine.

A particular lifting system, such as a crane, has a maximum load-lifting capacity $C_{max}$. In practice, lifting capacity may also depend upon the momentary crane radius in a manner which is known per se, a discussion of which is not required in the context of this disclosure. The lifting system includes a hoist cable, then end of which includes an attachment assembly, such as a hook block for example, for coupling to payloads to be lifted by the lifting system. For proper operation of the lifting system, the weight of the attachment assembly $W_{attach}$ must be sufficiently high. For example, for proper operation of the lifting system, it may be important to ensure that load bearing cables are kept under appropriate levels of tension and to ensure that cables are kept in relevant guide grooves such as sheave wheel grooves. It may also be necessary to ensure that the lifting assembly has enough weight to overcome the weight of the hoisting cable and any frictional forces in the system so that, for example, the attachment assembly may drop unassisted when positioned at the highest lifting position of the lifting system. In this regard, the force required to be applied for proper operation of the lifting system may be considered in terms of a threshold weight $W_{thres}$ for the lifting system. Thus, the weight of the attachment assembly $W_{attach}$ must be greater than the threshold weight $W_{thres}$ in order for the attachment assembly to drop unassisted from the upper-most position of the lifting system and to maintain appropriate levels of tension in the lifting cable. If the weight of the attachment assembly $W_{attach}$ is not greater than the threshold weight $W_{thres}$, then one or more ballast weights, such as ballast plates (sometimes referred to as cheek plates), having a ballast weight $W_{bal}$ may need to be added to the attachment assembly to make the weight of the attachment assembly greater than the threshold weight $W_{thres}$. When a wind turbine component with a weight $W_{load}$, such as wind turbine blade, is to be lifted, a lifting tool with a weight $W_{tool}$ is generally used to attach the attachment assembly of the crane to the wind turbine component. In this regard, the lifting tool essentially operates as an interface between the attachment assembly and the wind turbine component. For the lifting system to be able to successfully lift the wind turbine component, the combined weight of the attachment assembly (including any ballast weights), the lifting tool, and the wind turbine component must be less than or equal to the maximum load-lifting capacity $C_{max}$ of the lifting system.

As wind turbine components grow larger and their weight $W_{load}$ increases, the size and weight of the lifting tool $W_{tool}$ will generally increase to accommodate the heavier component. This increase in the weight of the wind turbine component $W_{load}$ and lifting tool $W_{tool}$ means a lifting system with a greater maximum load-lifting capacity $C_{max}$ may be required to lift the heavier wind turbine component. Again, lifting systems with greater lifting capacity are costly and more difficult to move to the wind turbine installation site.

To avoid the cost and difficulty of employing a lifting system with greater lifting capability, a method is needed for lifting heavier wind turbine components without employing a lifting system with a larger maximum load-lifting capacity $C_{max}$.

SUMMARY

To these and other ends, a method for handling a wind turbine component is disclosed. The method includes providing a lifting system having a hoist cable and an attachment assembly coupled to the hoist cable. The attachment assembly preferably includes one or more removable ballast weights. The method includes positioning the attachment assembly near a working surface, such as the ground, platform, or deck of a ship; removing at least some of the one or more ballast weights from the attachment assembly; and attaching a lifting tool to the attachment assembly. The combined weight of the attachment assembly, including any remaining ballast weights, and the lifting tool is sufficiently greater than a threshold weight of the lifting system. The method further includes attaching a wind turbine component to the lifting tool and moving the wind turbine component using the lifting system.

In one aspect of the invention, the one or more ballast weights includes a plurality of ballast plates and removing at least some of the one or more ballast weights further includes removing one or more of the plurality of ballast plates from the attachment assembly. In a further aspect, the ballast plates removed from the attachment assembly may be less than or equal to the weight of the lifting tool and, more specifically, the weight of the ballast plates removed from the attachment assembly may be substantially equal to the weight of the lifting tool.

As will be appreciated, attaching a wind turbine component to the lifting tool may include attaching one of a nacelle, a hub, a wind turbine rotor, a wind turbine blade, or a wind turbine powertrain or sub-elements thereof to the lifting tool. The lifting tool may be specifically tailored to interface with such wind turbine components. As will also be appreciated, moving the wind turbine component may further include moving the wind turbine component from adjacent the working surface to a position adjacent an upper section of a wind turbine tower during assembly of a wind turbine. Similarly, moving the wind turbine component may further included moving the wind turbine component from adjacent an upper section of a wind turbine tower to a position adjacent the working surface during disassembly of a wind turbine. Thus, the method may be used in both the assembly and disassembly of a wind turbine.

In another embodiment, the method may include additional steps implemented subsequent to moving the wind turbine component using the lifting system. For example, the method may also include positioning the attachment assembly and the lifting tool adjacent the working surface; removing the lifting tool from the attachment assembly; and reattaching the removed ballast weights (e.g., the ballast plates) to the attachment assembly. The lifting system may then be used in a conventional sense.

In a further embodiment, a lifting system for handling a wind turbine component is disclosed. The lifting system includes a hoist cable, an attachment assembly coupled to the hoist cable, and a lifting tool attached to the attachment assembly. The combined weight of the attachment assembly and the lifting tool is sufficiently greater than a threshold weight of the lifting system. In this regard, the weight of the attachment assembly may be less than the threshold weight of the lifting system and it is by combining the attachment assembly with the lifting tool that the combined weight is sufficiently greater than the threshold weight. In an exemplary embodiment, the attachment assembly may include one or more selectively removable ballast weights, which in one embodiment may include a plurality of ballast plates. In various embodiments, the lifting tool may be configured to interface with a nacelle, a hub, a wind turbine rotor, a wind turbine blade, or a wind turbine powertrain or sub-elements thereof. The lifting system may include a crane in an exemplar embodiment.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION OF THE INVENTION

Figure 1:
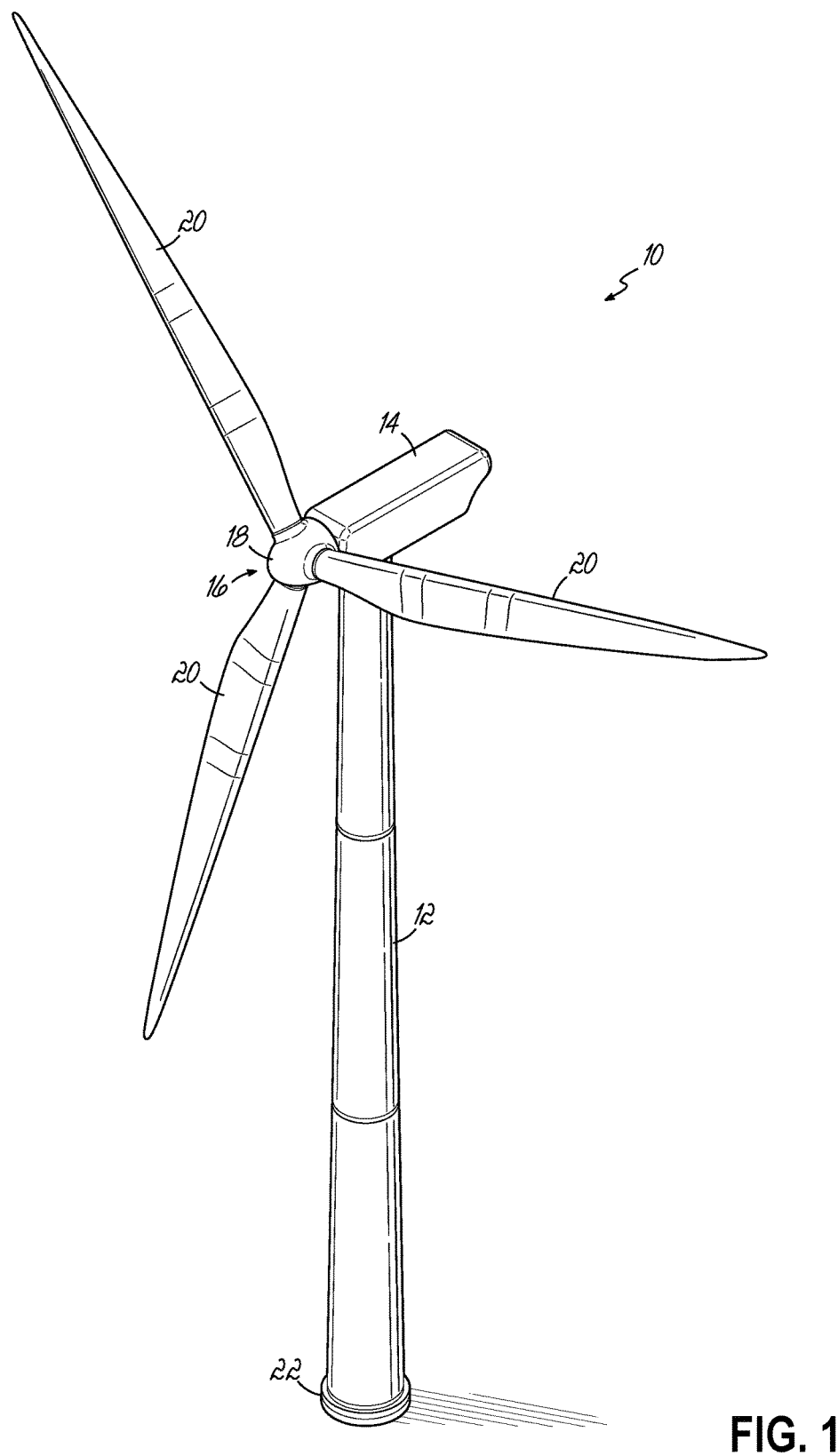
FIG. 1 is perspective view of a wind turbine assembled according to an aspect of the invention.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of the wind turbine 10 includes a central rotor hub 18 and a plurality of blades 20 that project outwardly from the central hub 18 at locations circumferentially distributed thereabout in equal intervals. In the representative embodiment, the rotor 16 includes first, second, and third blades 20, but the number may vary. The blades 20 are configured to interact with the passing air flow to produce lift that causes the rotor hub to spin about a longitudinal axis defined thereby. As shown, the tower 12 includes a foundation or base 22 for supporting the wind turbine 10. It should be recognized that the wind turbine 10 may be an on-shore or an off-shore wind turbine.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

Figure 2:
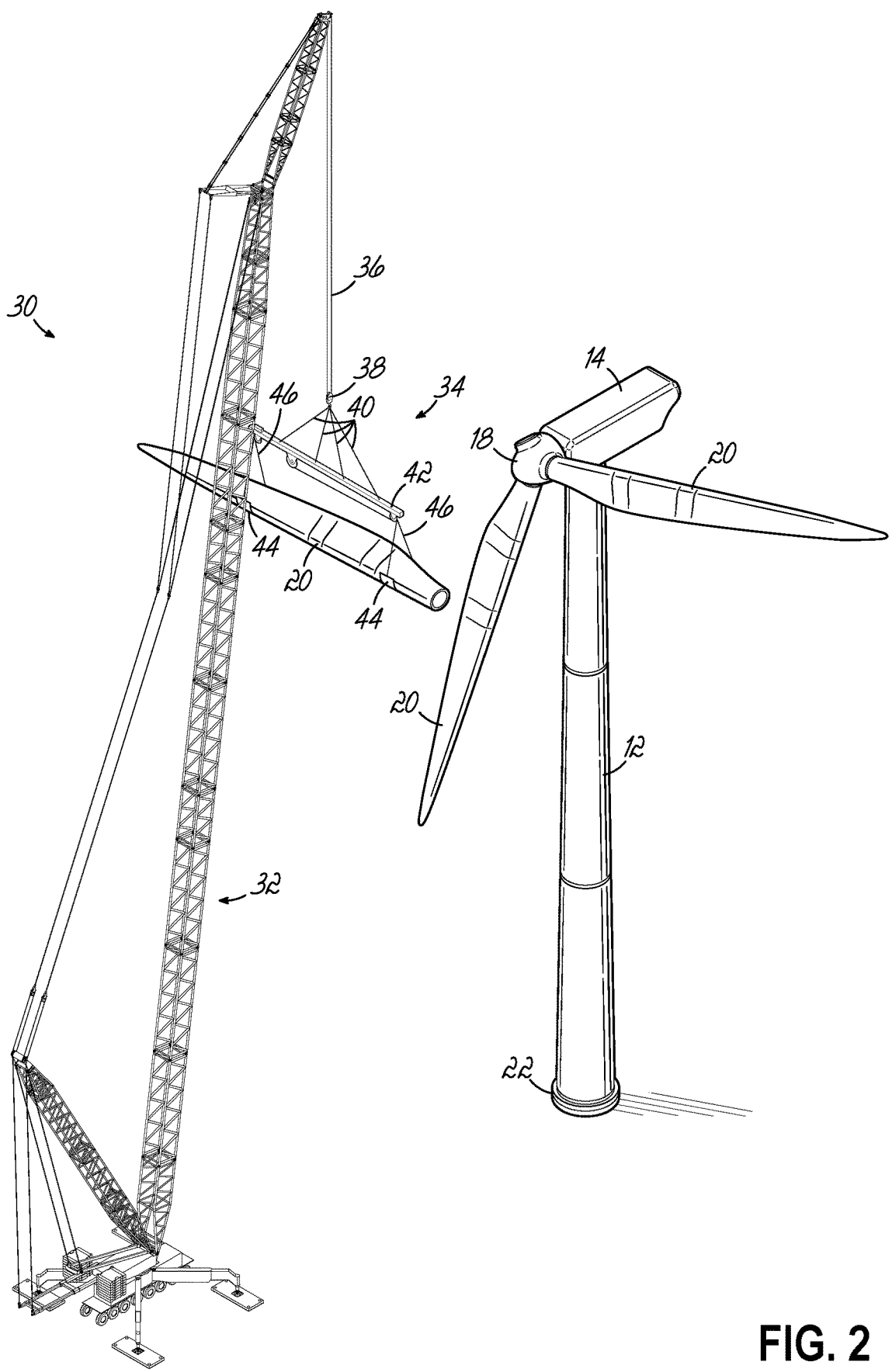
FIG. 2 is a perspective view showing crane lifting a wind turbine blade to a partially assembled wind turbine.

In accordance with an aspect of the invention, a main component of the wind turbine 10, such as the nacelle 14, hub 18 or a wind turbine blade 20, may be hoisted to or from a position proximate the top of the tower 12. With reference to FIG. 2, and as set forth in further detail below, an exemplary lifting system 30 for installing and/or dismantling the main components of wind turbine 10 includes a crane 32, a lifting tool 34 for coupling to a wind turbine component, a hoist cable 36 operatively coupled to the crane 32, and an attachment assembly 38 (FIG. 3) operatively coupled to the hoist cable 36. In one embodiment, the attachment assembly 38 may be referred to as a hook block, which may include a lifting hook. As illustrated in FIG. 2, the crane 32 and the lifting tool 34 are hoisting a wind turbine blade 20 to be suspended proximate the nacelle 14 so the blade 20 may be attached to the hub 18. The exemplary lifting tool 34 may include a plurality of slings 40, a yoke 42, and a pair of cradles 44 suspended from the yoke 42 via one or more cables 46. It will be appreciated that lifting tools with different configurations may be used to accommodate different wind turbine components, such as a nacelle, a hub, a wind turbine rotor, a wind turbine blade, or a wind turbine powertrain or sub-elements thereof, such as a generator, a main shaft, and a gearbox. For example, the lifting tool for the nacelle 14 will generally be different from the lifting tool for a wind turbine blade 20, which will each be different from the lifting tool for the hub 16. Such lifting tools for the various wind turbine components are generally known in the wind turbine industry and will not be further described herein.

Figure 3:
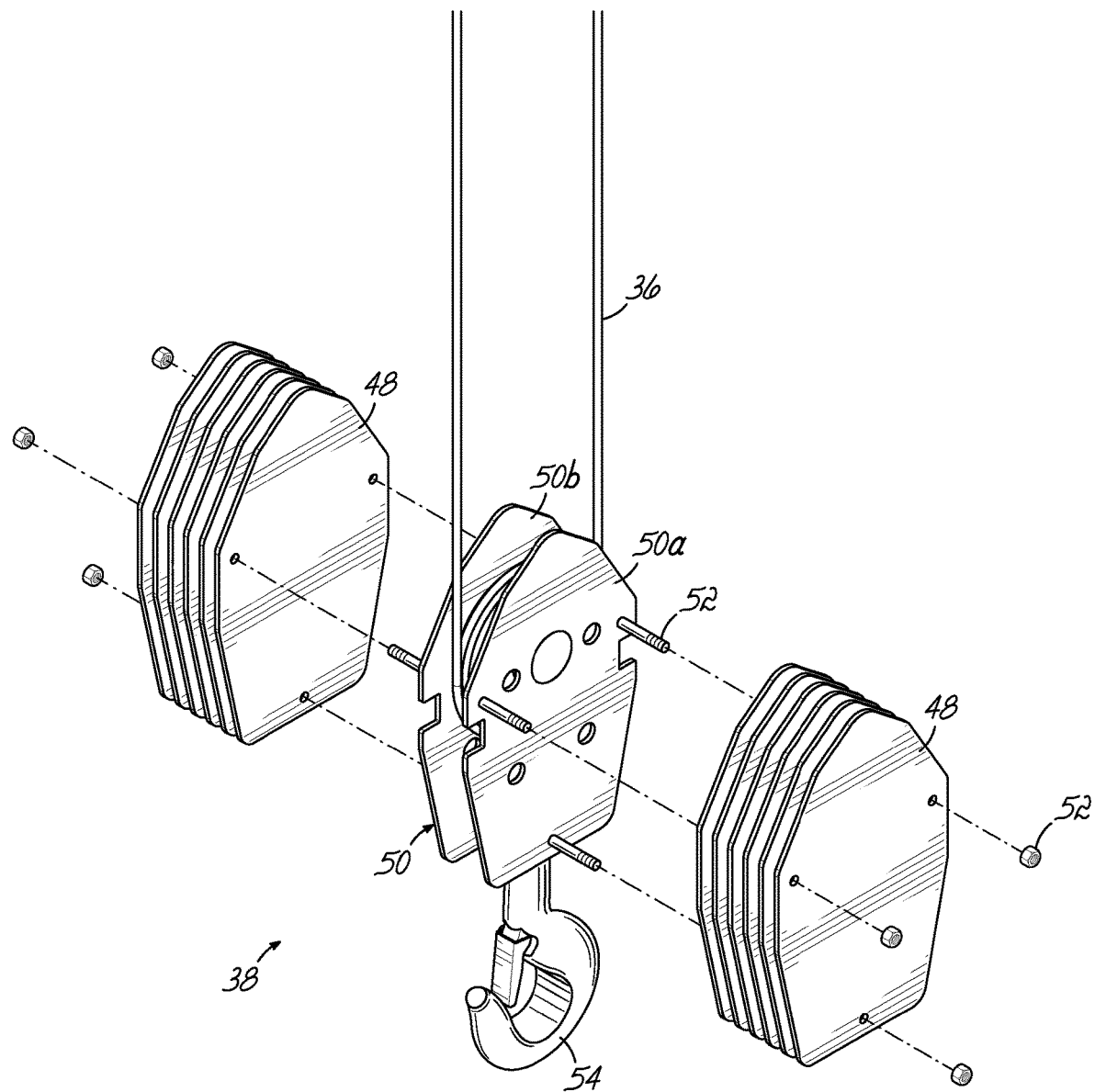
FIG. 3 is a perspective view of an attachment assembly with the ballast plates removed.

As illustrated in FIG. 3, an exemplary attachment assembly 38 may include a base 50 defined by, for example, base members 50a, 50b and a lifting hook 54 coupled to the base 50 and configured to attach to a payload for handling by the crane 32. In one embodiment, the attachment assembly 38 may further include one or more selectively removable ballast weights 48, such as a plurality of ballast plates (which in one embodiment may be referred to as cheek plates), for increasing the weight of the attachment assembly 38. The ballast plates 48 may be selectively, removably attached to the side of base members 50a, 50b, which form part of the attachment assembly 38. For example, fasteners 52, such as bolts and nuts, may be used to secure the ballast plates 48 to the base members 50a, 50b. Each ballast plate 48 has a known weight and collectively the ballast plates 48 attached to the base members 50a, 50b have a known ballast weight $W_{bal}$. Other devices, such as straps, clevis fastener, etc. besides hook 54 may be incorporated into the attachment assembly 38 to provide a way to attach the lifting tool 34 to the attachment assembly 38. Other types of ballast weights besides ballast plates may also be used, such as a so-called "headache ball." In one embodiment, the lifting hook 54 may be removed from the attachment assembly 38 in addition to removing the ballast plates 48. This option may be used, for example, when the lifting tool 34 may be operatively connectable to the attachment assembly 38 without requiring the use of the lifting hook 54. Advantageously, removing the lifting hook 54 may further decrease the weight of the attachment assembly 38 prior to attaching the lifting tool 34, and thereby increase the weight of the payload that may be lifted by the crane 32.

Figure 4:
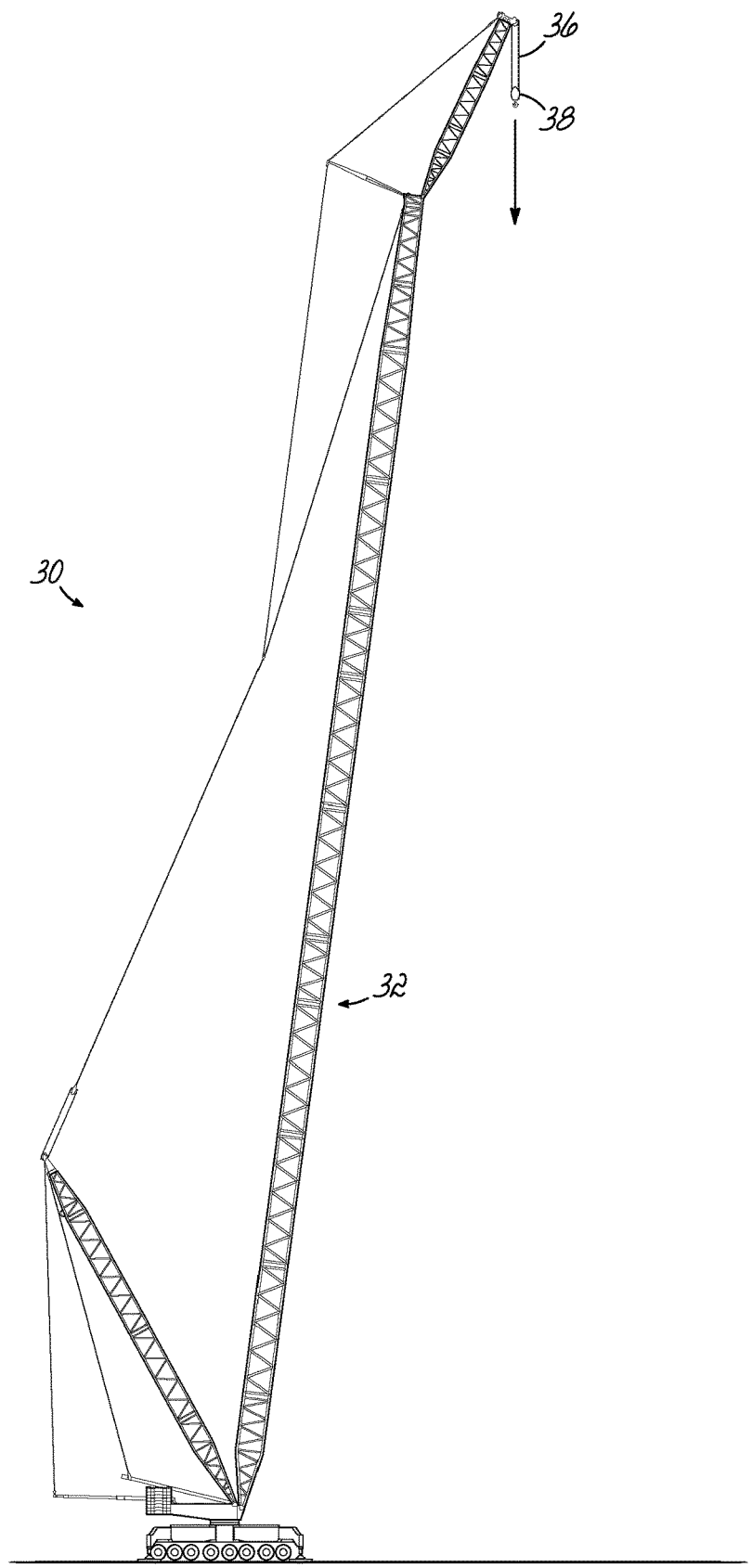
FIG. 4 is a side view of a crane with the attachment assembly at the upper-most position of the crane.

FIG. 4 shows the crane 32 with the attachment assembly 38 in an upper-most position. The attachment assembly 38 may be coupled to the hoist cable 36 during the initial assembly of the crane 32. Here, the upper-most position may refer to a configuration where the main boom of the crane 32 is rotated as close to vertical as possible and the attachment assembly 38 is positioned (raised) to essentially its highest point possible, i.e., close to the top pulley as possible. In the upper-most position, the weight of the attachment assembly $W_{attach}$ must be sufficient to ensure the load bearing cables are kept under appropriate levels of tension, to ensure the cables are kept in relevant guide grooves, such as sheave wheel grooves, and to overcome the combined weight of the hoist cable 36 and the frictional forces, such as in pulleys (not shown), so that the attachment assembly 38 drops in an unassisted manner. The weight to achieve these operational criteria with the attachment assembly 38 at the upper-most position may be considered in terms of a threshold weight $W_{thres}$ of the crane 32. Thus, in the normal course of crane operation the weight $W_{attach}$ of the attachment assembly 38 must be sufficiently greater than the threshold weight $W_{thres}$ to allow the attachment assembly 38 to drop unassisted from the upper-most position to near a working surface that supports the crane 32 (e.g., the ground, platform, deck of a ship, etc.).

As used herein, sufficiently greater means no more than about 10% greater than the threshold weight $W_{thres}$, preferably no more than about 5% greater than the threshold weight $W_{thres}$, and even more preferably no more than about 2% greater than the threshold weight $W_{thres}$. In many lifting scenarios, the weight $W_{attach}$ of the attachment assembly 38 alone may not be great enough to achieve the operational criteria at the upper-most position, such as, overcoming the combined weight of the hoist cable 36 and the frictional forces in the crane 32. Thus, when the weight $W_{attach}$ of the attachment assembly 38 is less than the threshold weight $W_{thres}$, additional weight $W_{bal}$ in the form of ballast weight 48, e.g., ballast plates, must be added to the attachment assembly 38 so that the weight $W_{attach}$ of the attachment assembly 38 including the ballast weight $W_{bal}$ is sufficiently greater than the threshold weight $W_{thres}$. In this way, the attachment assembly 38 (with the included ballast weight 48) may drop down unassisted from the upper-most position of the crane 32 to near the working surface. The arrangement of the attachment assembly 38, including the one or more ballast weights 48, to be sufficiently greater than the threshold weight $W_{thres}$ required for proper operation of the crane 32 is in the normal course of assembling the crane 32 for operation.

In order for a lifting system 30 to successfully complete a lift operation of a wind turbine component, the combined weight of the attachment assembly $W_{attach}$, including any ballast weight $W_{bal}$, the lifting tool $W_{tool}$, and the wind turbine component $W_{load}$ must be equal to or less than the maximum load-lifting capacity $C_{max}$ of the lifting system 30. In other words, and in mathematical terms, $$C_{max} \geq W_{attach} + W_{bal} + W_{tool} + W_{load} \qquad (1)$$

In accordance with an aspect of the invention, the combined weight of the attachment assembly $W_{attach}$ (including any ballast weight $W_{bal}$) and lifting tool $W_{tool}$ may be minimized so that the weight of the wind turbine component $W_{load}$ may be maximized. Consequently, a heavier load may be lifted by the lifting system 30 without having to use another lifting system with a greater maximum load-lifting capacity $C_{max}$. Thus, as illustrated in FIG. 4, the method for hoisting a wind turbine component includes initially providing the lifting system 30 with the attachment assembly 38 and one or more ballast weights 48 where the combined weight of the attachment assembly 38 and the ballast weights 48 (e.g., ballast plates) is sufficiently greater than a threshold weight $W_{thres}$ for that lifting system 30.

Figure 5:
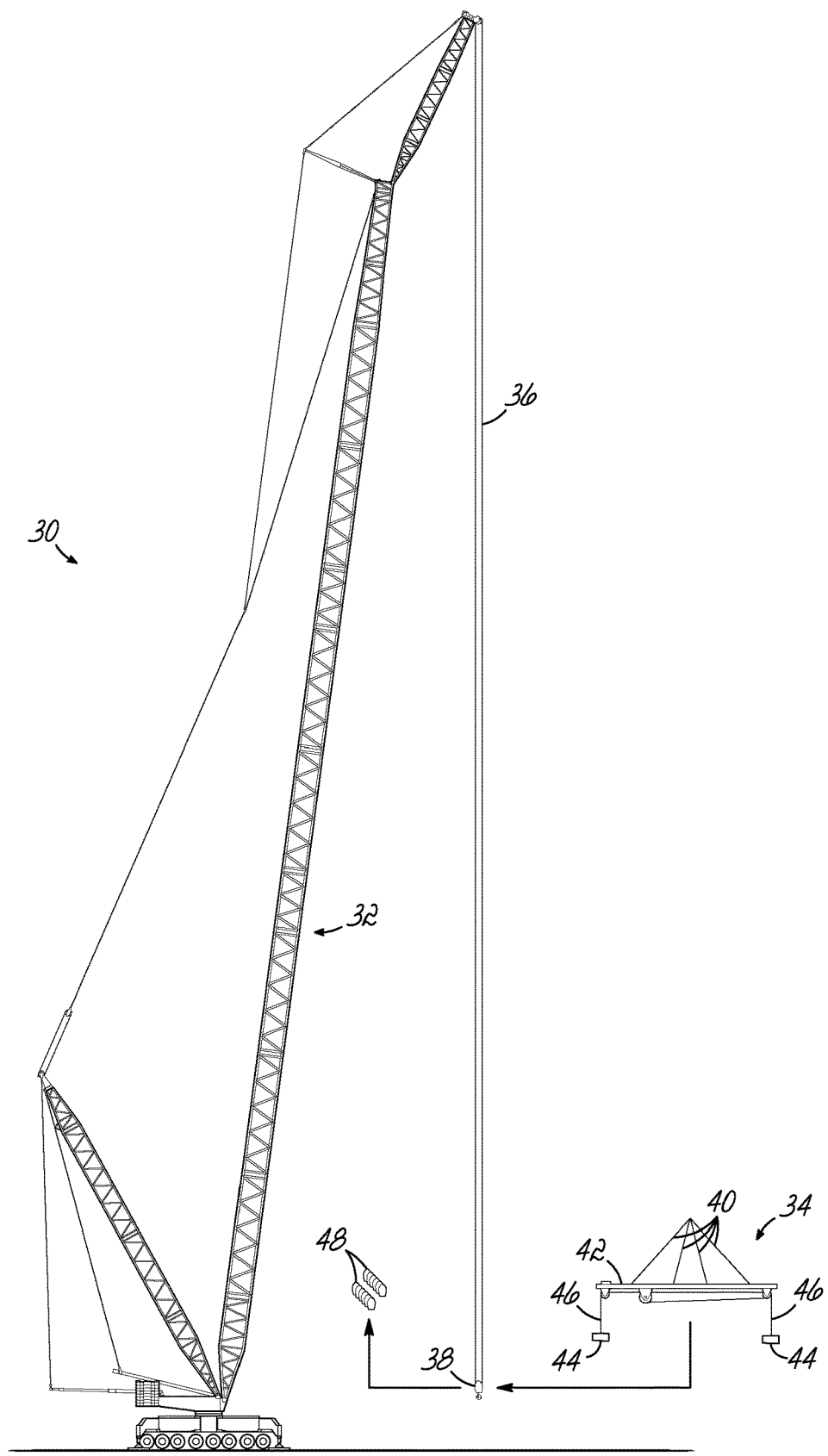
FIG. 5 is a side view of the crane of the FIG. 4 with the attachment assembly in a lower position with the ballast plates removed and lifting tool to be attached to the attachment assembly.
Figure 6:
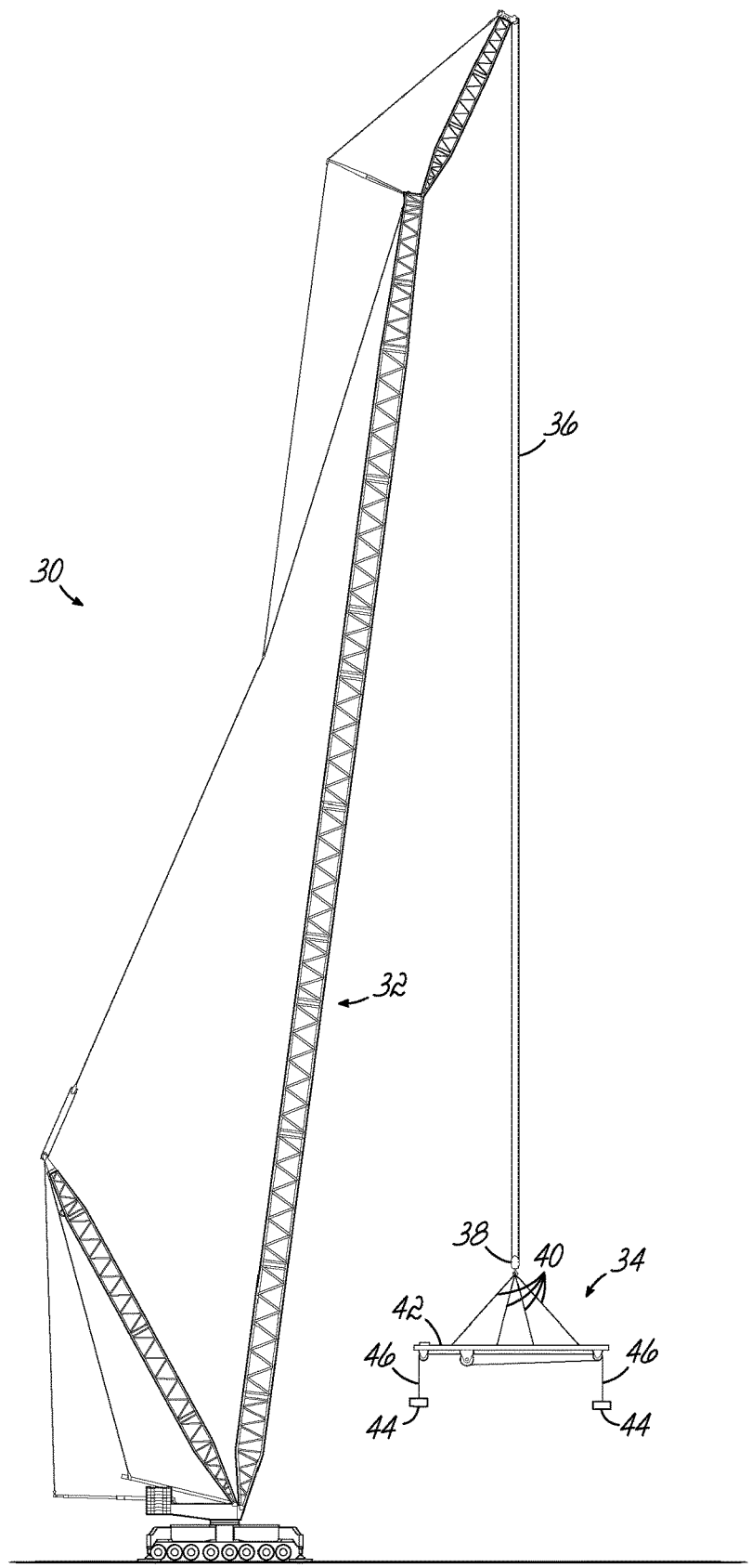
FIG. 6 is a side view of the crane of FIG. 4 with a lifting tool attached to the attachment assembly.

Subsequently and as illustrated in FIG. 5, the attachment assembly 38 may be positioned near the working surface (e.g., ground, platform, deck of a ship, etc.) and at least some of the one or more ballast weights 48 may then be removed from the attachment assembly 38. Next, the lifting tool 34 may then be coupled to attachment assembly 38, as illustrated in FIG. 6. In an advantageous aspect, the combined weight of the attachment assembly 38 (including any remaining ballast weights 48) and the lifting tool 34 may be configured to be sufficiently greater than the threshold weight $W_{thres}$ of the lifting system 30. In other words, the role of the ballast weights 48 on the attachment assembly 38 in order to reach the threshold weight $W_{thres}$ now being provided by the lifting tool 34. In one embodiment, for example, the weight $W_{tool}$ of the lifting tool 34 should be greater than and preferably substantially equal to the weight $W_{bal}$ of the ballast weights 48 removed from attachment assembly 38. It should be appreciated that in some embodiments, only some of the ballast weights 48 may be removed before the lifting tool 34 is attached to the attachment assembly 38. In other embodiments, however, all of the ballast weights 48 may be removed before the lifting tool 34 is attached to the attachment assembly 38. Minimizing the combined weight of the attachment assembly 38, including the ballast weights 48, and the lifting tool 34 to be sufficiently greater than the threshold weight $W_{thres}$ of the lifting system (or as close as possible should the weight $W_{tool}$ of the lifting tool 34 be greater than the weight $W_{bal}$ of the ballast weights 48) allows the weight of the wind turbine component $W_{load}$ being handled by the crane 32 to be maximized.

As illustrated in FIG. 2, with the lifting tool 34 connected to the attachment assembly 38, the wind turbine component, such as a wind turbine blade 20, may be coupled to the lifting tool 34 and then lifted to an upper section of the wind turbine 10 during, for example, assembly of the wind turbine 10. After the wind turbine blade 20 (or other wind turbine component) is installed, the attachment assembly 38 and the lifting tool 34 may be lowered to the surface so that another wind turbine component may be affixed to the same or different lifting tool 34 and hoisted to an upper section of the wind turbine. This process may be repeated until all wind turbine components are hoisted to an upper section of the wind turbine 10 and installed. The operations may be reversed when disassembling the wind turbine 10.

When the lifting tool(s) 34 is/are no longer needed, the lifting tool 34 may be removed from the attachment assembly 38 and the one or more ballast weights 48, e.g., the ballast plates, may be reinstalled on the attachment assembly 38. Again, the combined weight of the attachment assembly 38 and the one or more ballast weights 48 may be sufficiently greater than the threshold weight $W_{thres}$ for that lifting system. In this way, the lifting system may be used in a conventional sense for handling other aspects of wind turbine installation. If the ballast weights 48 are not reinstalled on the attachment assembly 38 and the attachment assembly 38 is lifted to the upper-most position, the attachment assembly 38 may be unable to drop unassisted from the upper-most position. Thus, it is important to reattach the ballast weights 48 to the attachment assembly 38 after removing the lifting tool 34.

Moving up in crane size to perform a wind turbine installation results in a significant increase in costs associated with the rental, operation and transport of the crane. Aspects of the present invention are directed to using a lifting system, such as a crane, in a particular way that maximizes the payload that is able to be hoisted by the lifting system when taking into account the weight of operational equipment, such as the attachment assembly (e.g., hook block) and lifting tool, necessary to achieve a particular lift. More particularly, aspects of the invention are directed to using the combined weight of the attachment assembly and the lifting tool to be sufficiently greater than the threshold weight required for proper operation of the lifting system. This may be achieved by selectively removing one or more ballast weights associated with the attachment assembly. By configuring the attachment assembly (including any remaining ballast weights) and the lifting tool to be just sufficiently greater than the threshold weight of the lifting system (as opposed to just the attachment assembly, including ballast weights, being slightly greater than the threshold weight of the lifting system, as in convention crane arrangements), the weight of the payload hoisted by the lifting system may be maximized. This in turn may allow a smaller crane to lift larger wind turbine components during assembly or disassembly of a wind turbine, and thereby avoid the increased costs associated with a larger crane.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for handling a wind turbine component, comprising:
    providing a lifting system including a hoist cable, an attachment assembly coupled to the hoist cable, and a lifting tool, wherein the attachment assembly includes one or more removable ballast weights;
    positioning the attachment assembly near a working surface;
    removing at least some of the one or more ballast weights from the attachment assembly;
    attaching the lifting tool to the attachment assembly, wherein the combined weight of the attachment assembly and the lifting tool is no more than 10% greater than a threshold weight of the lifting system;
    attaching a wind turbine component to the lifting tool; and
    moving the wind turbine component using the lifting system.

2. The method of claim 1, wherein positioning the attachment assembly near the working surface further comprises positioning the attachment assembly near a ground, a platform, or a deck of a ship.

3. The method of claim 1, wherein the one or more ballast weights comprises a plurality of ballast plates, and wherein removing at least some of the one or more ballast weights further comprises removing one or more of the plurality of ballast plates from the attachment assembly.

4. The method of claim 3, wherein the weight of the ballast plates removed from the attachment assembly is less than or substantially equal to the weight of the lifting tool.

5. The method of claim 4, wherein the weight of the ballast plates removed from the attachment assembly is substantially equal to the weight of the lifting tool.

6. The method of claim 1, wherein attaching a wind turbine component to the lifting tool includes attaching one of a nacelle, a hub, a wind turbine rotor, a wind turbine blade, or a wind turbine powertrain or sub-elements thereof to the lifting tool.

7. The method of claim 1, wherein moving the wind turbine component further comprises moving the wind turbine component from adjacent the working surface to a position adjacent an upper section of a wind turbine tower during assembly of a wind turbine.

8. The method of claim 1, wherein moving the wind turbine component further comprises moving the wind turbine component from adjacent an upper section of a wind turbine tower to a position adjacent the working surface during disassembly of a wind turbine.

9. The method of claim 1, wherein subsequent to moving the wind turbine component using the lifting system, the method further comprises:
    positioning the attachment assembly and the lifting tool adjacent the working surface;
    removing the lifting tool from the attachment assembly; and
    reattaching the removed one or more ballast weights to the attachment assembly.

10. The method of claim 1, wherein the combined weight of the attachment assembly and the lifting tool is no more than 5% greater than a threshold weight of the lifting system.

11. The method of claim 1, wherein the combined weight of the attachment assembly and the lifting tool is no more than 2% greater than a threshold weight of the lifting system.

12. A lifting system for handling a wind turbine component, comprising:
- a hoist cable;
- an attachment assembly coupled to the hoist cable; and
- a lifting tool attached to the attachment assembly,
- wherein the combined weight of the attachment assembly and the lifting tool is no more than 10% greater than a threshold weight of the lifting system, and
- wherein the weight of the attachment assembly is less than the threshold weight of the lifting system.

13. The lifting system of claim 12, wherein the combined weight of the attachment assembly and the lifting tool is no more than 2% greater than a threshold weight of the lifting system.

14. The lifting system of claim 12, wherein the combined weight of the attachment assembly and the lifting tool is no more than 5% greater than a threshold weight of the lifting system.

15. The lifting system of claim 12, wherein the attachment assembly includes one or more selectively removable ballast weights.

16. The lifting system of claim 15, wherein the one or more selectively removable ballast weights includes a plurality of ballast plates.

17. The lifting system of claim 12, wherein the lifting tool is configured to interface with one of a nacelle, a hub, a wind turbine rotor, a wind turbine blade, or a wind turbine tower segment, or a wind turbine powertrain or sub-elements thereof.

18. The lifting system of claim 12, wherein the lifting system includes a crane.

\* \* \* \* \*